Patented Sept. 25, 1934

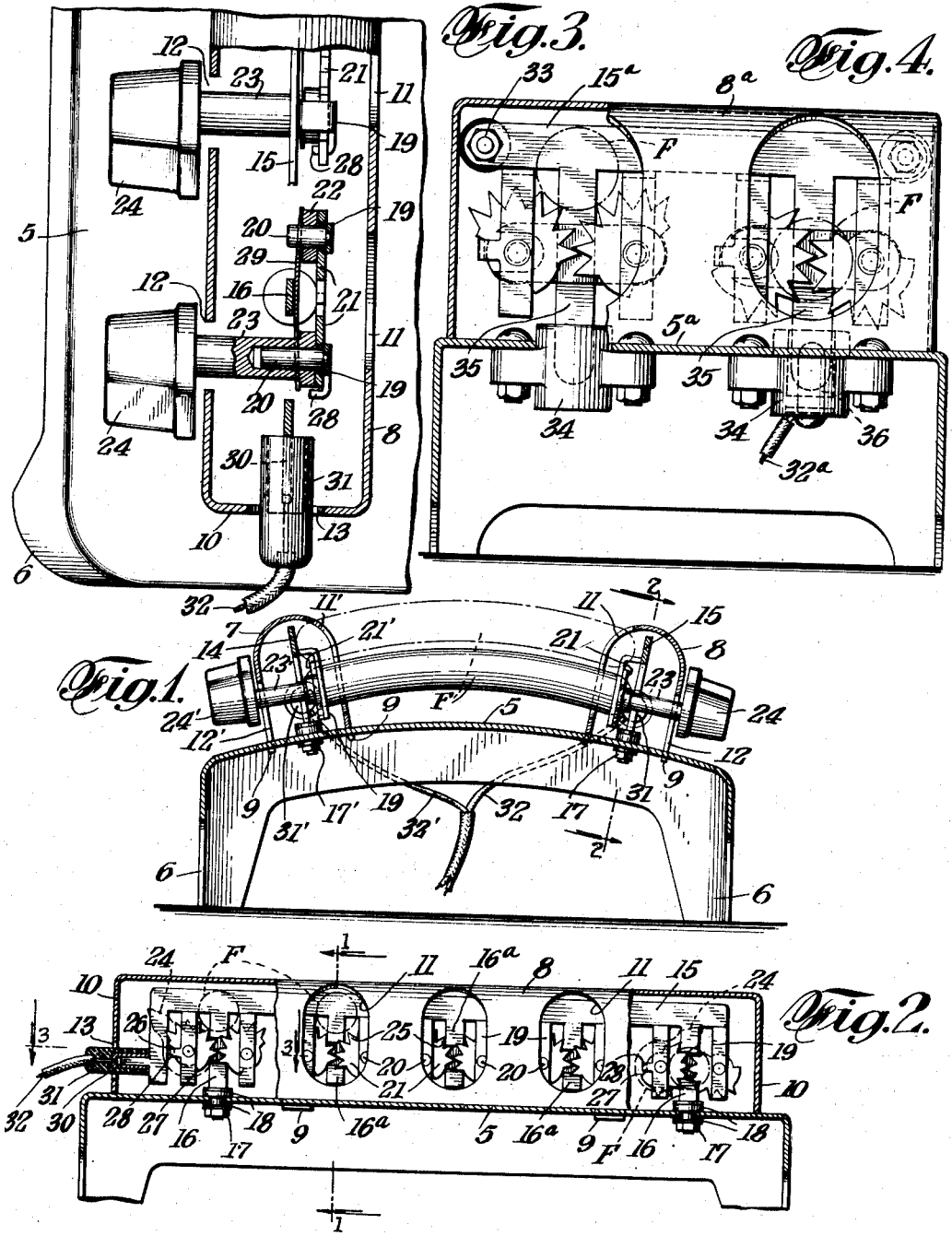

1,974,715

UNITED STATES PATENT OFFICE 1,974,715

ELECTRIC FRANKFURTER GRILL

Samuel Kohn, Bronx, N. Y.

Application October 17, 1932, Serial No. 638,110

18 Claims. (Cl. 219—19)

The present invention relates to electric Frankfurter grills or the like and is especially characterized by the fact that heat is produced within the Frankfurter. This in a general way, is accomplished by having the Frankfurter act as a resistance to the flow of an electric current.

The usual forms of grills, stoves, etc., for cooking Frankfurters, whether by gas or electricity are objectional in many respects in that excessive heat, objectional odors and accumulation of grease drippings make for the extreme discomfort of the attendant of such cooking means. Further, when such stoves are used by purveyors of hot Frankfurters, it is necessary to always have a supply in the process of cooking and they tend to become dry and shriveled waiting to be sold and therefore lose the juicy, savory taste so desirable.

The present inventor has knowledge of several devices for cooking or grilling Frankfurters by passing an electric current through them and so far as he knows, none of these have been practically successful. He has discovered, after due study, that the means employed for contacting the Frankfurters have in a short while become coated with an accumulation of grease which formed an effective insulator and so prevented current from passing to the Frankfurter. He has solved this problem in the present invention by providing a grill of this character with self-cleaning contact members adapted to grip the ends of the Frankfurter. Said cleaning of contacts occurring both upon insertion and ejection after cooking of the Frankfurter.

It is therefore an important object of the invention to provide a grill of this character with self cleaning contacts which is comparatively cold to the touch while one or more Frankfurters are being grilled by passing electric current through them.

Another object is in the provision of a grill having batteries of opposed self-cleaning, Frankfurter-end, gripping members to conduct the current to and from the Frankfurters.

Another object is in the provision of self cleaning contact members which are so mounted that by manual rotation or otherwise, each end of the Frankfurter is gripped to receive the cooking current and reversely, ejected when the cooking process is finished.

A still further object of the invention is to provide a grill having certain portions easily removable for cleaning.

These and many other objects and advantages, including economy of construction and ease and infallibility of operation will become more apparent from the following specification which describes the accompanying illustrated embodiment of the invention, and in which:

Fig. 1 is a transverse sectional view of a grill constructed in accordance with the present invention as taken along the line 1—1 of Figure 2.

Fig. 2 is a longitudinal sectional view thereof taken along the line 2—2 of Figure 1.

Fig. 3 is an enlarged fragmentary plan section taken along the line 3—3 of Figure 2, and Fig. 4 is an enlarged longitudinal view of a modified form of construction.

Referring to the drawing in greater detail, the reference number 5 designates a base of any suitable form which may be provided with legs 6. In this instance the base top is preferably arched in its transverse dimension as shown. Spaced housings 7—8 may be mounted thereon. These housings are preferably U-shaped in cross-section and may be removably mounted on the base by means of prongs 9 entering through slots in the base top. Each housing is preferably provided with closed ends 10, suitable openings 11 in the inner wall, cut-outs 12 in the outer wall and an opening 13 in one end wall.

Each housing is designed to cover a frame member, the housing 7 surrounding the frame 14 and the housing 8, the frame 15. Since these frames are exactly alike, except that they are respectively left hand and right hand, only the right hand one will be described. Prime numbers, where necessary, will designate corresponding portions on the left hand frame.

The frame 15 is provided with one or more legs 16 which may be secured to the base by means such as the nut 17, tho insulated therefrom by dielectric bushings and washers 18. If desired, other but shorter legs 16a may be provided.

Flanking each leg 16, 16a, there may be provided downreaching arms 19, offset from the plane of the legs, two arms and one leg being grouped, and each frame may be provided with any desirable number of such groups.

Substantially mid-way its length, each arm 19, may be provided with a pivot pin 20 for a pair of Frankfurter contacting and gripping members 21. One member of each pair is provided with a short hub 22 and the other with a shouldered shank 23, arranged to pass through one of the cut-outs 12, and having a manipulating handle 24.

The contact members 21 are arranged with interlacing teeth 25, preferably sharp pointed and adapted to pierce the skin casing of a Frankfurter. One or both contact members may be provided with stop shoulders 26, 27 to engage a lug 28 on one or both of the arms 19 of each group.

Each group is provided with means such as the leaf spring 29 to maintain wiping contact between each contact member and its supporting arm.

It can be readily seen from the foregoing that rotation of any one handle 24, will rotate a pair of contacts and that the rotation in either direction is limited by the engagement of the lug 28 by either shoulder 26 or 27, and since the spring 29 always presses the contacts 21 against the arms 19, any accumulations of grease, etc., will be wiped off the contacts during the rotation of them in either direction.

The frame 15 is provided at one end with a laterally extending tongue 30, engageable by a plug 31 at the end of a conductor 32, the plug being enterable through the opening 13 of the housing 8. The other frame 14 is similarly engaged with a plug 31' at the end of a conductor 32'. The conductors 32, 32' may then be united into one cable and connect with a source of electric current.

When it is desired to grill or cook a Frankfurter "F", it is only necessary to place its ends between opposite pairs of contacts as shown and as the handle for each pair of contacts is turned, their sharp teeth will bite into the respective ends of the Frankfurter and draw it downwardly in position shown in full lines in Fig. 1. There is now established an electric circuit as follows: conductor 32, tongue 30, frame 15, contacts 21, Frankfurter F, contacts 21', frame 14, plug 31' and conductor 32'. Heat will be generated within the Frankfurter since it acts as a high resistance to the flow of the current.

After a requisite time, the handles are turned in the opposite direction to expel the cooked Frankfurter and simultaneously the contacts wipe themselves clean as previously described.

Several Frankfurters may be grilled simultaneously and should they vary in length, they may be flexed as shown to permit their insertion between the contacts.

In the form above described, only the housings 6, 8 are removable for cleaning purposes but it may be desirable to remove the frames also for this purpose—Fig. 4 illustrates an alternate form of construction in which the housing 8a is connected to, though insulated from, the frame 15a as at 33.

The base 5a may have one or more sockets 34 receptive of the ends of the frame legs 35. Current may be conducted to the frame by means of a wire 32a and terminal 36. In all other respects the parts may be similar to those already described.

While this specification has described specifically, a Frankfurter grill, many other uses are obvious. No limitations in the breadth and scope of the appended claims by the foregoing detailed and thorough description is in anywise intended, since many changes and substitutions may be made by those skilled in the art.

Having thus described my invention, what I claim as new and desire to secure by Letters Patent, is:—

1. In a grill for cooking Frankfurters or the like, opposed pairs of rotatable contact members each pair being adapted upon rotation to grip an end of a Frankfurter and means including the contacts to conduct electric current to the Frankfurters.

2. In a grill for cooking Frankfurters or the like, opposed pairs of rotatable contact members each pair being adapted upon rotation to grip an end of a Frankfurter, each member having sharpened teeth in interlacing relation with the teeth of the mating member and means including the contact members to conduct current to the Frankfurters.

3. In a grill for cooking Frankfurters or the like, opposed pairs of rotatable, contact members each pair adapted to grip an end of a Frankfurter, stop means associated with the contact members to limit their movement and means including the contact members to conduct current to the Frankfurters.

4. A grill for cooking Frankfurters or the like comprising a base, spaced frame members disposed along the base top and insulated therefrom, a plurality of opposed pairs of contact members carried by each frame, means to individually operate each pair of contacts to grip the end of a Frankfurter, a housing for each frame having openings to receive the end of a Frankfurter and means including the frames and opposed pairs of contacts to conduct electric current to one or more Frankfurters.

5. A grill for cooking Frankfurters or the like comprising a base, spaced frame members disposed along the base top and insulated therefrom, plural Frankfurter gripping means on each frame, said gripping means also forming electric contact means; means to operate the gripping means to grip the end of a Frankfurter, a housing for each frame having openings in alignment with the gripping means and means including the frames and electric contact means to conduct electric current to a Frankfurter.

6. In a grill for cooking Frankfurters or the like, opposed pairs of contact members adapted to grip the ends of the Frankfurters, means to individually operate each pair of contacts, means to automatically clean said contacts during said operation and means including the contacts to conduct electric current to the Frankfurters.

7. In a grill for cooking Frankfurters or the like, opposed pairs of rotatable, sharp-toothed contact members adapted to grip the ends of the Frankfurters, means to individually rotate each pair of contacts to grip the end of a Frankfurter, means associated with the contacts to clean them during said rotation and means including the contacts to conduct electric current to the Frankfurters.

8. In a grill for cooking Frankfurters or the like, opposed pairs of rotatable, sharp-toothed contact members adapted to grip the ends of the Frankfurters, means to individually rotate each pair of contacts to grip the end of a Frankfurter, means associated with the contacts to clean them upon insertion in the end of a Frankfurter and means including the contacts to conduct electric current to the Frankfurter.

9. In a grill for cooking Frankfurters or the like, opposed pairs of rotatable contact members adapted to grip the ends of the Frankfurters, means to individually rotate each pair of contacts to grip the end of a Frankfurter, means associated with the contacts to clean them upon removal from the end of a Frankfurter and means including the contacts to conduct electric current to the Frankfurter.

10. In a grill for cooking Frankfurters or the like, opposed pairs of rotatable contact members adapted to grip the ends of the Frankfurters, means to individually rotate each pair of contacts to grip the end of a Frankfurter, resilient means associated with the contacts to clean them during said rotation and means including the contacts to conduct electric current to the Frankfurters.

11. In a grill for cooking Frankfurters or the like, opposed pairs of mating contact members at least one of the members of each pair being rotatably mounted to co-operate with its mate to pierce and grip an end of the Frankfurter between the members, and means including a contact member to conduct current to the Frankfurters.

12. A grill for cooking Frankfurters or the like comprising a base, spaced frame members disposed along the base top and insulated therefrom, a plurality of opposed pairs of contact members carried by each frame, means to individually operate each pair of contacts to grip the end of a Frankfurter, and means including the frames and opposed pairs of contacts to conduct electric current to one or more Frankfurters.

13. In an electric grill for cooking Frankfurters or the like, the combination with opposed pairs of co-acting electric terminals, of means adapted to grip the ends of the Frankfurters and to feed them into effective electrical engagement with the terminals.

14. In an electric grill for cooking Frankfurters or the like, the combination with opposed pairs of co-acting electric terminals, of means adapted to grip the ends of the Frankfurters and to feed them into and out of effective electrical engagement with the terminals.

15. In an electric grill for cooking Frankfurters or the like, opposed pairs of electric terminals adapted to grip the ends of the Frankfurters and to feed them into and out of effective electrical engagement therewith, and means resiliently engageable with the terminals to clean them automatically at some time during each feeding operation.

16. In an electric Frankfurter grill having opposed movable contacts for entering into and supplying current to cook Frankfurters or the like, the combination with the contacts, of means resiliently engageable therewith for automatically cleaning them as they are being entered into the Frankfurter.

17. In an electric Frankfurter grill having opposed movable contacts for entering into and supplying current to cook Frankfurters or the like, the combination with the contacts, of means resiliently engaged therewith for automatically cleaning them during their withdrawal from a Frankfurter.

18. In an electric Frankfurter grill having opposed movable contacts for entry into and supplying current to cook Frankfurters or the like, the combination with the contacts, of means adjacent thereto to clean them during their entry into and withdrawal from the Frankfurter.

SAMUEL KOHN.